United States Patent
Yuksel et al.

(10) Patent No.: US 9,123,046 B1
(45) Date of Patent: Sep. 1, 2015

(54) IDENTIFYING TERMS

(75) Inventors: Baris Yuksel, New York, NY (US); Ana Krulec, Mountain View, CA (US)

(73) Assignee: Google Inc., Mountain View, CA (US)

( * ) Notice: Subject to any disclaimer, the term of this patent is extended or adjusted under 35 U.S.C. 154(b) by 537 days.

(21) Appl. No.: 13/459,018

(22) Filed: Apr. 27, 2012

Related U.S. Application Data

(60) Provisional application No. 61/481,144, filed on Apr. 29, 2011.

(51) Int. Cl.
| | | |
|---|---|---|
| G06Q 10/10 | (2012.01) | |
| G06Q 30/02 | (2012.01) | |
| G06Q 10/06 | (2012.01) | |
| G06Q 30/06 | (2012.01) | |
| G06Q 10/08 | (2012.01) | |
| G06Q 30/00 | (2012.01) | |
| G06N 5/00 | (2006.01) | |

(52) U.S. Cl.
CPC ............... *G06Q 30/018* (2013.01); *G06N 5/00* (2013.01)

(58) Field of Classification Search
USPC ...................................... 705/1.1–912; 706/45
See application file for complete search history.

(56) References Cited

U.S. PATENT DOCUMENTS

| | | | | |
|---|---|---|---|---|
| 2005/0060643 | A1* | 3/2005 | Glass et al. | 715/501.1 |
| 2009/0077617 | A1* | 3/2009 | Levow et al. | 726/1 |
| 2009/0319518 | A1* | 12/2009 | Koudas et al. | 707/5 |

OTHER PUBLICATIONS

Segal, David, "Picking the Lock of Google's Search," The New York Times, Jul. 9, 2011, 4 pages, http://www.nytimes.com/2011/07/10/your-money/lead-gen-sites-pose-challenge-to-google-the-haggler.html?_r=3[Jul. 11, 2011 11:23:09 AM].

* cited by examiner

*Primary Examiner* — Jonathan Ouellette
(74) *Attorney, Agent, or Firm* — Fish & Richardson P.C.

(57) ABSTRACT

Methods, systems, and apparatus, including computer programs encoded on computer storage media, are described for identifying target terms, e.g., spam terms within a collection of documents. In one aspect, methods can include identifying spam terms by calculating a blacklist term frequency-inverse document frequency (BTF-IDF) score for multiple terms, and by selecting, as the spam terms, the terms that have scores above or below a threshold score. The multiple terms may be derived from documents that are associated with accounts that have been designated as spam accounts.

18 Claims, 4 Drawing Sheets

$$BTF\text{-}IDF = BTF \times IDF = BTF \times \log\left(\frac{N+1}{k+1}\right)$$

N: Number of non-spam accounts k: Number of documents from non-spam accounts, in which the term occurs BTF: Number of times the term occurs in merged document, from accounts that have been designated as spam accounts

FIG. 3

IDENTIFYING TERMS

CROSS-REFERENCE TO RELATED APPLICATIONS

This application claims the benefit under 35 U.S.C. §119 (e) of the filing date of U.S. Provisional Patent Application No. 61/481,144, entitled "Identifying terms", filed Apr. 29, 2011, which is incorporated here by reference.

BACKGROUND

This specification relates to identifying terms, e.g., spam terms within a collection of documents.

In the context of web mapping services, the owners of a business can attempt to attract customers by creating fake instances of their business in geographic locations where their business does not actually exist. These fake instances of a business, which are referred to by this specification as "map spam," may appear on a map interface generated by the web mapping service when a user searches for a business, and may drive traffic to an online- or telephone-based sales channel for the business. In general, businesses which practice map spamming rely on the fact that, when a user performs a search using a web mapping service to identify nearby businesses, the user may not reconfirm whether the business is actually located in an identified location.

As an example of map spam, a plumbing business may submit information to a web mapping service to indicate that the plumbing business has a brick-and-mortar presence on every block along a street. A user that lives along the street may search for a nearby plumber using the web mapping service when, for example, the user requires emergency plumbing service. Using the information that the plumbing business has provided, the web mapping service may display a map that shows that the plumbing business is near to the user, and may display a telephone number or web address of the plumbing business. Comforted by the fact that the plumbing business appears to be nearby, the user may contact the plumbing business for service, even though the plumbing business may in fact be located a great distance away, and other plumbing business may actually be located closer to the user.

Map spam may be detrimental to many different parties. For example, map spam harms the provider of the web mapping service because the information provided to the users is inaccurate, rendering the web mapping service's databases untrustworthy. Map spam harms users, who may experience delays when dealing with a business that is located farther from the user than is represented. Moreover, map spam harms local businesses, who may suffer a loss of business when local customers are diverted to faraway businesses, because of the faraway businesses' misleading listings.

SUMMARY

In some implementations, spam terms are identified by calculating a blacklist term frequency-inverse document frequency (BTF-IDF) score for multiple terms, and by selecting, as the spam terms, the terms that have scores above or below a threshold score. The multiple terms may be derived from documents that are associated with accounts that have been designated as spam accounts. For example, the multiple terms may be derived from account information, e.g., contact information or advertising information, that an account holder has supplied to a web mapping service.

In one example implementation, for each term, the BTF-IDF score may be calculated by counting the number of times the term is found in the documents that are associated with the accounts that have been designated as spam accounts, and comparing that number with the number of the times the term is found in the documents that are associated with the accounts that have not been designated as spam accounts. In some instances, the documents that are associated with the accounts that have been designated as spam accounts are merged into a single document before counting occurs, and the BTF-IDF score is calculated using an equation that is derived from the equation which is used to calculate a term frequency-inverse document frequency (TF-IDF) weight.

In general, one innovative aspect of the subject matter described in this specification can be embodied in methods that include the actions of receiving, for each of multiple accounts, a document associated with the account. The methods also include the actions of identifying the accounts that have been designated as spam accounts, and merging the documents that are associated with the accounts that have been designated as spam accounts, into a single, merged document. Further, the methods include the actions of determining, for each of one or more terms that occur in the merged document, a blacklist term frequency (BTF) that represents a number of times that the term occurs in the merged document. Furthermore, the methods include the actions of determining a number of accounts that have not been designated as spam accounts, and determining, for each of the terms, a number of the documents that are associated with accounts that have not been designated as spam accounts, in which the term occurs. In addition, the methods include the actions of determining, for each of the terms, an inverse document frequency (IDF) for the term based on the number of accounts that have not been designated as spam accounts, and the number of documents that are associated with the accounts that have not been designated as spam accounts, in which the term occurs. Also, the methods include the actions of determining, for each of the one or more terms, a blacklist term frequency-inverse document frequency (BTF-IDF) score by multiplying the blacklist term frequency for the term by the inverse document frequency for the term, and using the blacklist term frequency-inverse document frequency scores to identify spam terms.

Other embodiments of this aspect include corresponding computer systems, apparatus, and computer programs recorded on one or more computer storage devices, each configured to perform the actions of the methods. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The foregoing and other embodiments can each optionally include one or more of the following features, alone or in combination. In some implementations, determining the IDF for each of the terms is based only on the number of accounts that have not been designated as spam accounts and on the number of documents that are associated with the accounts that have not been designated as spam accounts, in which the term occurs. The determined BTF-IDF score associated with a term in the merged document satisfies $$BTF\text{-}IDF = BTF \times \log\left(\frac{N+1}{k+1}\right), \quad (1)$$

where N represents the determined number of the accounts that have not been designated as spam accounts, and k represents the determined number of the documents that are associated with the accounts that have not been designated as spam accounts, in which the term occurs.

In some implementations, the methods can include the actions of associating spam likelihood to each of the one or more terms in the merged document. The spam likelihood associated with a term is proportional to the determined BTF-IDF score associated with the term. In some implementations, the methods can include the actions of generating a data structure of spam terms based on sorting the terms included in the merged document based on the respective determined BTF-IDF scores, and providing the generated data structure for assessing whether a given account is a spam account or a non-spam account.

In some implementations, an account from among the multiple accounts can be associated with an entity that requested to present entity-related information at a geo-location represented on an online map. Further, the entity-related information can be stored in the document associated with the account and can include the geo-location, the entity's identifier, description of products or services offered by the entity, and one or more of the entity's contact info and the entity's website information.

In some implementations, the methods can include the actions of assessing whether a proposed account is a spam account or a non-spam account based on the spam terms identified by said using the BTF-IDF scores, and designating the proposed account as a spam account or a non-spam account based on a result of said assessment. In some implementations, the methods can include the actions of receiving a request to add a new account, and generating a score for the new account at least in part by applying the BTF-IDF scores corresponding to the terms included in the merged document. For example, generating the score for the new account can include adding, for all words included in a document associated with the new account, the corresponding BTF-IDF scores determined for the terms included in the merged document. As another example, generating the score for the new account can include adding, for distinct words included in a document associated with the new account, the corresponding BTF-IDF scores determined for the terms included in the merged document. In addition, the methods can include the actions of designating the new account as a spam account in response to determining that the generated score of the new account is larger than a specified threshold.

According to another innovative aspect, the described subject matter can also be implemented methods that include the actions of receiving, for each of multiple accounts, a document associated with the account, and identifying the accounts that have been designated as target accounts. The methods also include the actions of determining, for each of one or more terms that occur in documents corresponding to the target accounts, a frequency that represents a number of times that the term occurs in the documents corresponding to the target accounts. Further, the methods include the actions of determining a number of accounts that have not been designated as target accounts, and determining, for each of the terms, a number of the documents that are associated with accounts that have not been designated as target accounts, in which the term occurs. Furthermore, the methods include the actions of determining, for each of the terms, another frequency for the term based on the number of accounts that have not been designated as target accounts, and the number of documents that are associated with the accounts that have not been designated as target accounts, in which the term occurs.

Additionally, the methods include the actions of determining, for each of the one or more terms, a score by multiplying the frequency for the term by the other frequency for the term.

The foregoing and other embodiments can each optionally include one or more of the following features, alone or in combination. In some implementations, the methods can include the actions of merging the documents that are associated with the accounts that have been designated as target accounts, into a single, merged document, prior to said determining the respective frequencies of the one or more terms that occur in the documents that are associated with the accounts that have been designated as the target accounts. In addition, the methods can include the actions of using the scores to identify target terms.

In some implementations, the target accounts are spam accounts. For example, the frequency can be a blacklist term frequency (BTF) that represents a number of times that the term occurs in the documents corresponding to the spam accounts. As another example, the other frequency for the term is an inverse document frequency for the term determined based on the number of accounts that have not been designated as spam accounts, and the number of documents that are associated with the accounts that have not been designated as spam accounts, in which the term occurs.

Particular embodiments of the subject matter described in this specification can be implemented so as to realize one or more of the following advantages. For example, by reducing map spam in accordance with the disclosed technology, information stored in the web mapping service's databases is rendered trustworthy, such that the information provided to the users by the web mapping service can be accurate. Further, a user of the web mapping service may avoid delays caused by spam business located farther from the user than is represented, if such spam businesses are removed from the map-search by using the described systems and techniques. Furthermore, the disclosed technologies can reduce faraway businesses' misleading listings, which in turn can lead to local vendors/service providers gaining business over the faraway businesses.

In addition, reducing the number of spam accounts by using the processes disclosed in this specification can free storage space required to store the spam account information. Also, having to manage fewer spam accounts can result in maintaining more compact search indexes, which may in turn lead to faster searches. Additionally, the process of setting up new accounts can be simplified by using the disclosed technologies. For example, fewer required manual operations are needed for setting up proposed accounts, and the speed of reviewing the proposed accounts is increased. Moreover in some cases, new accounts can be set up automatically in accordance with the systems and techniques described in this specification.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 shows an example equation for generating scores that are used to rank spam terms in a collection of documents.

Like reference numbers and designations in the various drawings indicate like elements.

DETAILED DESCRIPTION

Figure 1:
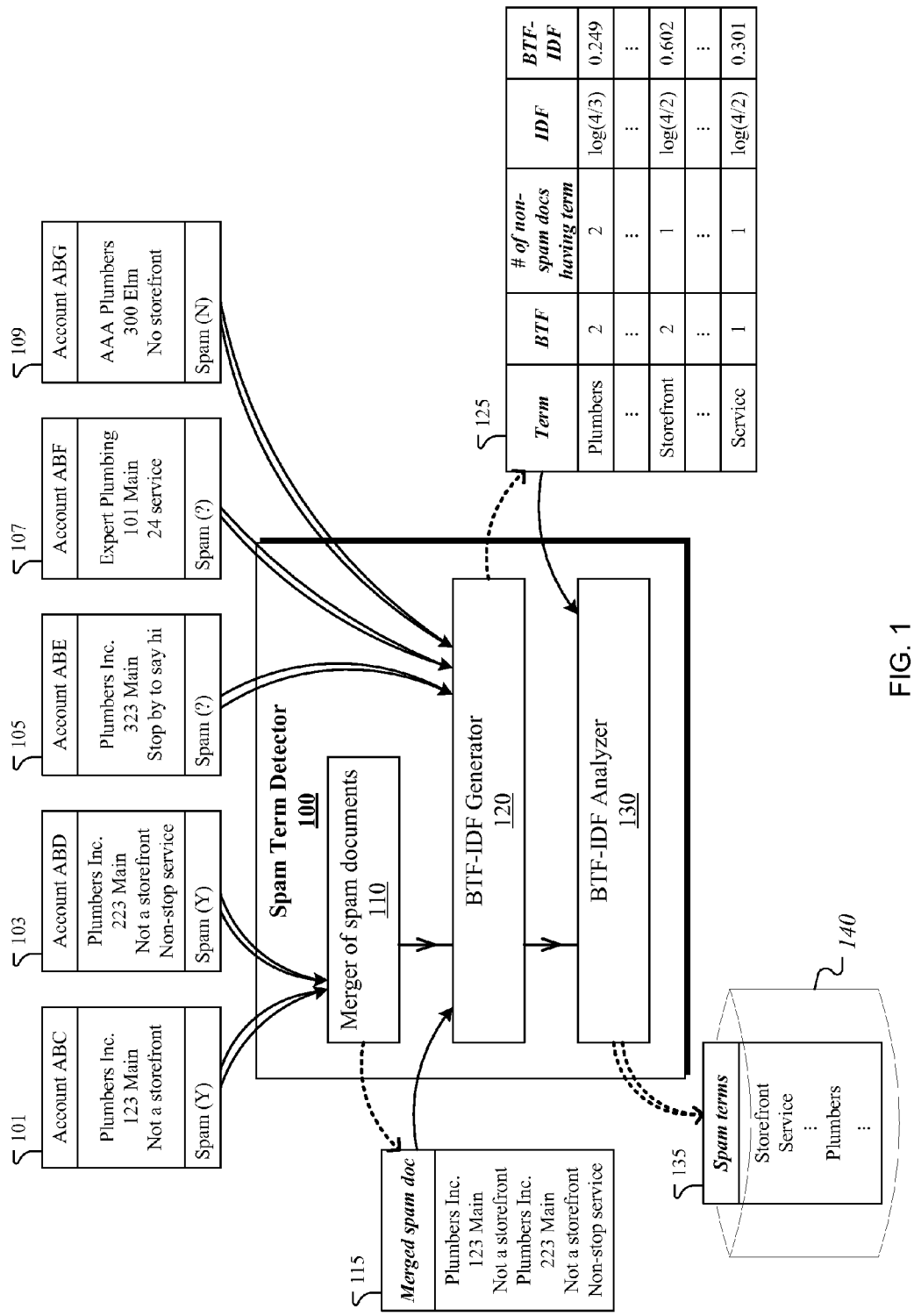
FIG. 1 illustrates an example spam term detector that identifies spam terms within a collection of documents.

FIG. 1 illustrates an example spam term detector 100 that identifies spam terms within a collection of documents. The spam term detector 100 can be implemented as a utility executed by a computer system, for example in conjunction with a web mapping service, (e.g., a provider of interactive electronic maps) to identify and/or score spam terms within a collection of documents associated with multiple accounts. Once the spam term detector 100 identifies and/or scores spam terms, the computer system may reference the spam terms to automatically classify new or proposed accounts as likely spam accounts or likely non-spam accounts.

The spam term detector 100 can receive documents 101, 103, 105, 107 and 109 associated with multiple accounts "ABC," "ABD," "ABE," "ABF," and "ABG," respectively. In this specification, a document may, but need not, correspond to a file. A document may be stored in a portion of a file that holds other documents, in a single file dedicated to the document in question, or in multiple coordinated files. Each account can be associated with an instance of a business, e.g., with a particular location or storefront identified by an account owner, such as a vendor or service provider. The documents associated with each account generally store business information related to the account, such as account identifiers, business identifiers, street addresses or other geo-location information, website information, contact information, advertising information, review information, boilerplate information, terms and policies, operating hours, slogans, or other information provided to the web mapping service by the respective account owners.

Some accounts, e.g., accounts "ABC" and "ABD," have been designated as spam accounts (in the figure, labeled "Spam (Y)"). These accounts may have been designated as spam accounts using the processes that are performed by the spam term detector 100, and that are described below, or the accounts may have been designated as spam accounts through other processes. For example, an account may be designated as a spam account when a user drives by a physical location that a vendor or service provider has identified as being a storefront, discovers that no such storefront actually exists, and reports this discrepancy to the web mapping service.

Other accounts, e.g., accounts "ABE," "ABF" and "ABG," are not designated as spam accounts. An account that has not been designated as a spam account may be an account that has not yet been evaluated (in the case of accounts "ABE" and "ABF," labeled "Spam ("?")"), or an account that has been evaluated and designated as non-spam accounts (in the case of account "ABG," labeled "Spam (N)").

The documents 101, 103, 105, 107 and 109 are received from the respective account owners by the spam term detector 100. The documents may be received by the spam term detector 100 when, for example, the respective account owners attempt to add a new instance of a business to the web mapping service, or when the respective account owners attempt to supplement information that they have previously provided in association with the instance.

In general, the received documents 101, 103, 105, 107 and 109 are processed by various modules of the spam detector 100 to generate a list of spam terms 135, which can be stored in persistent storage 140. In FIG. 1, these various modules include a document merger 110, a BTF-IDF generator 120, and a BTF-IDF analyzer 130.

The spam term detector 100 receives the documents 101, 103, 105, 107 and 109. The document merger 110 merges the documents 101, 103 that are associated with spam accounts, into a single, merged document 115. The resulting merged document 115 includes the aggregated content of both of the documents 101, 103. The merged document 115 is output from the document merger 110, and is provided to the BTF-IDF generator 120. The document merger 110 does not merge the documents 105, 106 and 109, as they are not associated with accounts that have been designated as spam accounts.

The merged document 115 and the documents 105, 107, 109 that are associated with accounts that have not been designated as spam accounts are input to the BTF-IDF generator 120. The BTF-IDF generator 120 determines a blacklist term frequency (BTF) for each of the terms that occur in the merged document 115. In some implementations, the BTF represents a number of times that a particular term occurs in the merged document 115. In FIG. 1, for example, the BTF-IDF generator determines that the term "storefront" has a BTF of "2," because the term "storefront" occurs in the merged document 115 twice. In some implementations, the spam documents 101 and 103 need not be merged in one single document, but are instead processed individually and/or sequentially. For example, in such implementations, a BTF associated with a term can be calculated separately for each document designated as spam. Then, the respective BTFs associated with the term corresponding to the multiple documents can be combined in a combined-BTF associated with the term. As another example, a BTF associated with the term that occurs in a document 101 associated with the spam account ABC can be determined by counting occurrences of the term in all the documents 101, 103 associated with the spam accounts ABC, ABD.

The BTF-IDF generator 120 also determines, for each of the terms in the merged document 115, a value k, representing a number of the documents 105, 107, 109 that are associated with accounts that have not been designated as spam accounts, in which the term occurs. In FIG. 1, for example, the BTF-IDF generator determines that the term "storefront" has a value k of "1," because, among documents 105, 107 and 109, the term "storefront" only occurs once, in document 109.

The BTF-IDF generator 120 also determines a value N, representing a total number of accounts that have not been designated as spam accounts. In FIG. 1, the BTF-IDF generator 120 determines a value N of "3," because three accounts, i.e., accounts ABE, ABF, and ABG, have not been designated as spam accounts.

Using the values k and N, the BTF-IDF generator 120 determines an inverse document frequency (IDF) for each term from the merged document 115. In some implementations, the IDF for a term satisfies Equation (2):

$$IDF = \log\left(\frac{N+1}{k+1}\right). \tag{2}$$

In the example FIG. 1, the BTF-IDF generator 120 calculates an IDF of log(4/2), or "0.301", for the term "storefront."

Further, the BTF-IDF generator 120 determines the BTF-IDF score for each term by multiplying the BTF for the term, by the IDF for the term. The BTF-IDF generator may generate a table 125 or other dataset, specifying the respective BTF-IDF scores for each term in the merged document 115. As shown in table 125, the BTF-IDF generator 120 determines a BTF-IDF score of "0.602" for the term "storefront."

The BTF-IDF analyzer 130 receives the BTF-IDF scores output from the BTF-IDF generator, e.g., as reflected in the table 125. Because the BTF-IDF scores reflect an extent to which a term exhibits characteristics associated with spam terms, the BTF-IDF analyzer 130 uses the BTF-IDF score associated with each term of the merged document 115 to coarsely classify the term as spam or not spam. In other implementations, the BTF-IDF analyzer assigns a finer spam likelihood to each term, e.g., most-likely spam, likely spam, unlikely spam, etc.

The BTF-IDF analyzer 130 can generate a list of spam terms 135, for example by applying a predefined or dynamically defined threshold to the BTF-IDF scores, and selecting the terms of the merged document 115 that have a BTF-IDF score which satisfies the threshold. The BTF-IDF analyzer 130 may instead designate the terms of the merged document 115 that have a highest or lowest associated BTF-IDF score, in absolute terms or in terms of a percentage, as spam terms. In other implementations, the BTF-IDS analyzer 130 may designate the terms as likely spam terms or as candidate spam terms, to be subject to further evaluation.

The BTF-IDF analyzer 130 can sort the list of spam terms 135 by respective BTF-IDF score, and can provide the list of spam terms 135 to the web mapping service. As described below with reference to FIG. 4, the web mapping service may, for example, use the list of spam terms 135 to assess whether a new account is a spam account or a non-spam account.

Figure 2:
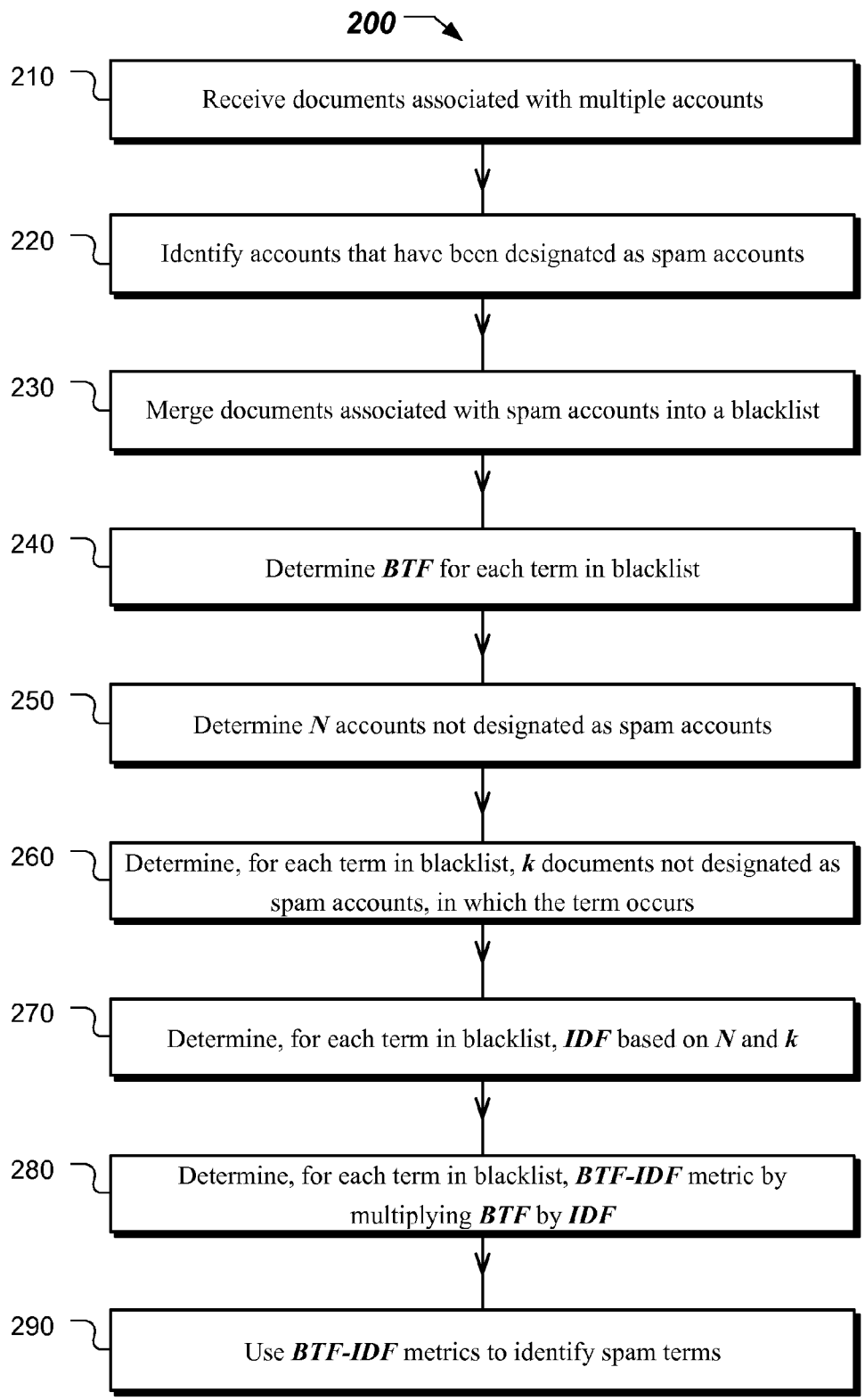
FIG. 2 is an example of a method for identifying spam terms within a collection of documents.

FIG. 2 is an example of a process 200 for identifying spam terms within a collection of documents. For example, the process 200 can be executed by one or more computers, for example in conjunction with a web mapping service, to identify and/or score spam terms within a collection of documents associated with multiple accounts.

At 210, a document associated with each of multiple accounts is received. In the context of a web mapping service, the multiple accounts can be associated with respective instances of businesses, e.g., with particular locations identified by the account owners. The respective documents can include business information related to the associated accounts, such as business identifiers, street addresses, contact information, and slogans. The documents can be received from the respective account owners through some document uploading process, for instance. A large number of accounts and their associated documents can be managed by the web mapping service. For example, there may be tens of accounts associated with storefronts located on each block of a city's commercial and/or business districts. Sources of data other than business accounts can be used.

At 220, the accounts that have been designated as spam accounts are identified. In some implementations, an account can be automatically identified as a spam account by using, for example, the spam term detector 100 described in connection with FIG. 1. In some implementations, the processes used for identifying the spam accounts can receive manual input for consideration. For example, an account may be designated as a spam account based on user input determining that no such storefront actually exists at the visited location of a physical location identified by an account owner as being a storefront.

At 230, the documents associated with the accounts that have been designated as spam accounts are merged, into a single, merged document. In some implementations, all of the terms present in the merged document are evaluated as possible spam terms.

The number of accounts identified as spam accounts M may represent a fraction of the total number of accounts managed by the web mapping service. The terms included in respective M documents associated with the M accounts that were designated as spam accounts are stored into the merged document. For example, terms from a second document associated with a second spam account can be entered in the merged document after terms from a first document associated with a first spam account; terms from a third document associated with a third spam account can be entered in the merged document after the terms from the second document associated with the second spam account, and so on. The merged document therefore forms a sequence of terms including the terms associated with the first account stored at the beginning of the merged document, the terms associated with the second account stored in the middle of the merged document, and the terms associated with the last, $M^{th}$ account stored at the end of the merged document. Merging the documents may include filtering terms that already occur within the document.

As another example, the merged document can be generated by storing a sequence of terms including the terms associated with the first account stored at the end of the merged document, the terms associated with the second account stored in the middle of the merged document, and so on, with the terms associated with the last, $M^{th}$ account stored at the beginning of the merged document.

At 240, for each of one or more terms in the merged document, a BTF is determined, such that BTF represents a number of times that the term occurs in the merged document. A term in the merged document can be a single word, e.g., any one of the words "free", "is", "or", "prompt", "service" or "the". For example, to determine the BTF of the term "service", BTF("service"), all the occurrences of the word "service" in the merged document are counted. Further, to determine the BTF of the term "the", BTF("the"), all the occurrences of the word "the" in the merged document are counted.

In some implementations, a BTF is not calculated for terms that occur in a stoplist, for example common terms such as "the" or "a." If a BTF has already been calculated for a term, the BTF may not be re-calculated if the term occurs again in the merged document.

In an example, the terms can be the n-gram "prompt service or the service is free." To determine the BTF of the term "prompt service or the service is free," BTF("prompt service or the service is free"), all the occurrences of this combination of six words in the merged document, in this exact order and having the word "service" repeated twice, are counted. For some instances of the merged document, the determined BTF ("service") and BTF("the") may be very large numbers, which is indicative that the terms "service" and "the" are good candidates to be evaluated as spam terms in accordance with the process 200.

In some implementations, the BTF of a term present in one of the documents associated with the spam accounts is determined by counting the number of times the term is found in all the documents that are associated with the accounts that have been designated as spam accounts, without merging these documents into the merged document.

At 250, a number of accounts that have not been designated as spam accounts is determined. For example, the number N of accounts from among the multiple accounts managed by the web mapping service that have not been designated as spam accounts can be accounts that have not yet been evaluated, or that have been evaluated and designated as non-spam accounts. The N accounts that have not been designated as spam accounts is found by subtracting the M accounts that have been identified as spam accounts from a total number of accounts (M+N) managed by the web mapping service.

At 260, for each of the terms, a number of the documents that are associated with accounts that have not been designated as spam accounts, in which a term occurs, is determined. The determined number k of documents associated with accounts designated as non-spam accounts in which the term "service" occurs can be small compared to the number N of documents associated with accounts designated as non-spam accounts, k<<N.

In one example, the term "service" may occur infrequently in documents associated with accounts designated as non-spam accounts. This determination would confirm that the term "service" is a good candidate to be classified as a spam term, as initially suggested by the large BTF("service") determined at 240.

The determined number k of documents associated with accounts designated as non-spam accounts in which the term "the" occurs can be almost equal to the number N of documents associated with accounts designated as non-spam accounts, k≈N. Specifically, the term "the" may appear in almost all the documents associated with accounts designated as non-spam accounts. Such a determination would contradict the assumption that the term "the" is a good candidate to be classified as a spam term, as initially suggested by the large BTF("the") determined at 240.

At 270, for each of the terms, an inverse document frequency (IDF) for the term is determined based on the number N of accounts that have not been designated as spam accounts, and the number k of documents that are associated with the accounts that have not been designated as spam accounts, in which the term occurs. The determined IDF of a term can be used as a multiplying weight that either reduces the likelihood that the term is classified as spam term, when the term commonly appears in the accounts designated as non-spam accounts, or that reinforces the likelihood that the term is classified as spam term if the term infrequently appears in the accounts designated as non-spam accounts.

For example, to determine the IDF for the term "service" based on Equation (2), the log of a large ratio, $(N+1)/(k+1) >> 1$, is calculated. Hence, the IDF("service") results in a value much larger than zero. However, to determine the IDF for the term "the" based on Equation (2), the log of a ratio approximately equal to 1, $(N+1)/(k+1) \approx 1$, is calculated. Hence, the IDF("service") results in a value close to zero.

At 280, for each of the one or more terms, a blacklist term frequency-inverse document frequency (BTF-IDF) score is determined by multiplying the BTF for the term (as determined at 240) by the IDF for the term (as determined at 270.) In this fashion, a term can have a large BTF-IDF score if the term has a large BTF, corresponding to many occurrences of the term in the merged document, and has a large IDF, corresponding to a small number of documents associated with accounts designated as non-spam accounts in which the term occurs.

Accordingly, a large BTF-IDF score determined for a given term can reflect that the given term exhibits characteristics associated with spam terms. Moreover, a term can have a small BTF-IDF score under the following different circumstances: (i) the term has a large BTF, corresponding to many occurrences of the term in the merged document, but has a small IDF, corresponding to a large number of documents associated with accounts designated as non-spam accounts in which the term occurs; (ii) the term has a large IDF, corresponding to a small number of documents associated with accounts designated as non-spam accounts in which the term occurs, but has a small BTF, corresponding to few occurrences of the term in the merged document; and (iii) the term has a small BTF, corresponding to few occurrences of the term in the merged document, and has a small IDF, corresponding to a large number of documents associated with accounts designated as non-spam accounts in which the term occurs. Accordingly, a small BTF-IDF score determined for a given term can reflect that the given term does not exhibit characteristics associated with spam terms.

At 290, the BTF-IDF scores determined at 280 are used to identify spam terms. As described above, the determined BTF-IDF scores can reflect an extent to which a term exhibits characteristics associated with spam terms. Therefore, the BTF-IDF score associated with each term of the merged document can be used to classify the term as spam or not spam.

In some implementations, a spam likelihood proportional with the associated BTF-IDF can be assigned to each term in the merged document. In the latter case, all the terms in the merged document are treated as spam terms. In some implementations, spam terms are selected from among the terms in the merged document by applying a predefined or dynamically defined threshold to the BTF-IDF scores, and selecting the terms of the merged document that have a BTF-IDF score which satisfies the threshold. In some implementations, terms from the merged document that have a highest or lowest associated BTF-IDF score, in absolute terms or in terms of a percentage, can be designated as spam terms or likely spam terms.

The identified spam terms can be sorted by respective BTF-IDF score and can provided as a sorted list of spam terms to the web mapping service, as described above in connection with FIG. 1. The web mapping service may use the provided list of spam terms to assess whether a proposed account is a spam account or a non-spam account as described below in connection with FIG. 4. Additionally, the web mapping service may use the provided list of spam terms to reassess a current designation of the M spam accounts and of the N accounts not designated as spam accounts. In some implementations, the reassessment can be performed periodically, for example every six months. In other implementations, the reassessment can be performed every time a user requests a map search from the web mapping service.

FIG. 3 shows an example equation for generating scores that are used to rank spam terms in a collection of documents. The collection of documents includes one blacklisted document associated with accounts that have been designated as spam accounts, and N other documents that are not associated with accounts that have been designated as spam accounts.

The terms included in the blacklisted document are considered candidate spam terms, and are scored and evaluated as described below. In some implementations related to email spam, the blacklisted document from the collection of documents can be generated by merging the content of M emails that were discovered in spam email accounts. In addition, the N other documents from the collection of documents that are not blacklisted correspond to emails that were discovered in accounts that are not designated as spam email accounts.

In other implementations related to web spam, the blacklisted document from the collection of documents can be generated by merging the content of M webpages that were found on domains or subdomains that have been designated as spam domains or subdomains. Further, the N other documents from the collection of documents that are not blacklisted correspond to webpages that were found on domains or subdomains that have not been designated as spam domains or subdomains. In some other implementations related to map spam, the blacklisted document from the collection of documents can be generated by merging the content of M documents associated with accounts designated as spam accounts. Additionally, the N other documents from the collection of documents that are not blacklisted correspond to accounts that have not been designated as spam accounts.

The score 300 represents BTF-IDF of a term included in the blacklisted document. The BTF of a term in the blacklisted document is determined as a number of times that the term occurs in the blacklisted document. The IDF of a term in the blacklisted document is determined as the log of a ratio that has in the numerator a total number of documents in the collection of documents, i.e., the merged, blacklisted document is counted as "1" plus the N other documents that are not blacklisted are counted separately, and in the denominator a total number of documents in which the term occurs, i.e., the blacklisted, merged document is counted as "1" plus the total number k of the documents that have not been blacklisted, and in which the term occurs, are counted separately. Finally, the score 300 of a term in the blacklisted document can be determined as the BTF-IDF by multiplying BTF and IDF, based on Equation (1')

$$BTF\text{-}IDF = BTF \times \log\left(\frac{N+1}{k+1}\right). \tag{1'}$$

The candidate spam terms from the merged document that are scored based on Equation (1') can be used to generate a document score for a newly received document that is to be added to the collection of the documents. Further, the generated document score can be used to assess a spam likelihood of the newly received document.

In implementations related to email spam, an email filter may use the scored spam terms to assess whether an incoming email is spam email or non-spam email. Based on a result of the assessment, the email filter may direct the incoming email to the addressee's inbox if the incoming email is classified as non-spam email, or may quarantine the received email if the incoming email is classified as spam email.

In implementations related to web spam, a webpage filter may use the scored spam terms to assess whether a webpage to which a user seeks access is a spam webpage or a non-spam webpage. Based on a result of the assessment, the webpage filter may selectively allow or disallow loading of the webpage to which the user sought access.

In implementations related to map spam, a web mapping service may use the scored spam terms to assess whether a proposed account is a spam account or a non-spam account, as described below in connection with FIG. 4. Based on a result of the assessment, the web mapping service may selectively accept or reject registration of the proposed account. In case of a rejection, the web mapping service can de-rank or remove information related to the proposed account from results of map searches.

Figure 4:
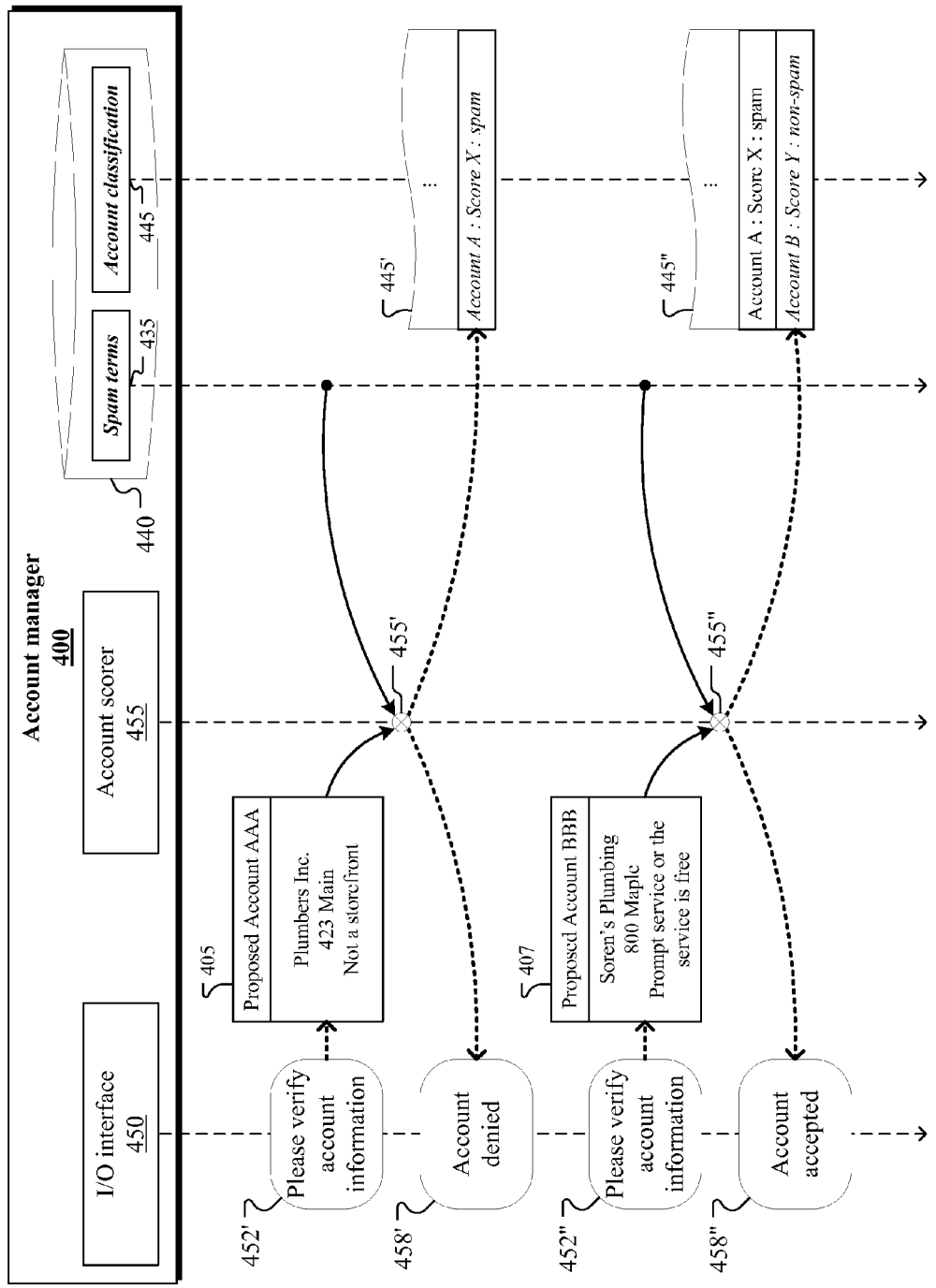
FIG. 4 shows an example of an account manager system that determines whether an account is a spam account or a non-spam account.

FIG. 4 shows an example of an account manager 400 used to determine whether an account is a spam account or a non-spam account. The account manager 400 can be implemented as a utility executed by one or more computers, for example in conjunction with a web mapping service, to automatically classify new or proposed accounts as likely spam accounts or likely non-spam accounts by referencing spam terms identified and scored by the spam term detector 100 described above in connection with FIG. 1.

Initially, the account manager 400 can receive documents 405, 407 associated with proposed accounts "AAA," and "BBB." As described above in connection with FIG. 1, each of the proposed accounts "AAA," and "BBB" can be associated with an instance of a business, e.g., with a particular location or storefront identified by the account owner such as a vendor or a service provider. The documents 405, 407 store information provided by the owners of the proposed accounts "AAA", and "BBB" to the web mapping service about the respective instances of the businesses.

In general, the documents 405, 407 can be received through an input/output (I/O) interface 450 of the account manager 400 and are processed by one or more modules of the account manager 400 to classify the proposed accounts "AAA", and "BBB" associated with the received documents 405, 407 as likely spam or non-spam accounts. In FIG. 4, the one or more modules include an account scorer 455.

The account scorer 455 generates scores of the received documents 405, 407 based on a list of spam terms 435 stored in persistent storage 440, and then classifies the proposed accounts "AAA", and "BBB" based on the generated scores. For example, the list of spam terms 435 can be the list of spam terms 135 generated by the spam term detector 100 as described above in connection with FIG. 1. Account scores and classifications generated by the account scorer 455 can be recorded in a data structure 445 (e.g., a table) stored in the persistent storage 440.

The persistent storage 440 can be part of the account manager 400, for example, can be a storage device included in the computer system executing the account manager utility. However, the persistent storage 440 does not need to be part of the account manager 400, instead the persistent storage 440 can be implemented as a storage device communicatively coupled with the account manager 400 as part of a network attached storage (NAS), of a storage area network (SAN) or of cloud storage.

The I/O interface 450 is implemented as a user interface through which users of the account manager 400 can provide account information for opening new accounts with the web mapping service, for example. In this case, the users of the user interface are associated with the proposed accounts "AAA", and "BBB", for example the users can be owners of the business associated with the proposed accounts "AAA", and "BBB".

In some implementations, the users can enter the account information into a form of the I/O interface 450 to generate the documents 405, 407 associated with the proposed accounts "AAA", and "BBB", respectively. In other implementations, the users can upload the documents 405, 406 to the I/O interface 450. In either of these implementations, the I/O interface 450 can present respective prompts 452', 452" for the users to verify the provided account information, before relaying the documents 405, 407 to the account scorer 455.

The users associated with the proposed accounts "AAA", and "BBB" can interact with different instances of the I/O interface 450. For example, the users can interact with sequential instances of the I/O interface 450. In this example, the user associated with the proposed account "AAA" can provide document 405 at a first time instance, and the user associated with the proposed account "BBB" can provide document 407 at a second time instance, later than the first time instance. The prompt 452' presented to the user associated with the proposed account "AAA" corresponds to the first time instance, and the prompt 452" presented to the user associated with the proposed account "BBB" corresponds to the second time instance, later than the first time instance.

In another example, the users can interact with simultaneous instances of the I/O interface 450. In this second example, the user associated with the proposed account "AAA" provides document 405 through a first online instance of the I/O interface 450 at a same time when the user associated with the proposed account "BBB" provides document 407 through a second online instance of the I/O interface 450. In this case, the prompt 452' presented to the user associated with the proposed account "AAA" corresponds to the first online instance of the I/O interface 450, and the prompt 452" presented to the user associated with the proposed account "BBB" corresponds to the second online instance of the I/O interface 450.

The account scorer 455 receives documents 405, 407 from the I/O interface 450 and can retrieve information from the list of spam terms 435 stored in persistent storage 440. The account scorer 455 generates account scores corresponding to the received documents 405, 407 and classifies the proposed accounts "AAA", and "BBB" based on the scores associated with the generated account scores.

The classifications of the proposed accounts "AAA", and "BBB" and the respective generated scores are recorded by the account scorer 455 in an account classification table 445 stored in the persistent storage 440, for instance. Based on results of the classifications, the account scorer 455 can instruct the I/O interface 450 to selectively present notifications 458', 458" to inform the user(s) associated with the respective proposed accounts "AAA", and "BBB" whether the account registration was denied or allowed.

Generating a score for the document 405 and classifying the proposed account "AAA" can be performed by an instance of the account scorer 455' which is different from an instance of the account scorer 455" which performs generating a score for the document 407 and classifying the proposed account B. For example, the different instances of the account scorer 455', 455" can be performed sequentially by a same data processing apparatus, e.g., by a core of a central processing unit. As another example, the different instances of the account scorer 455', 455" can be performed simultaneously by different data processing apparatuses, e.g., by different cores of the central processing unit.

The account scorer 455 can generate scores for proposed accounts "AAA", and "BBB" by scoring terms included in the respective documents 405, 407 associated with the proposed accounts "AAA", and "BBB" at least in part based on spam likelihoods of corresponding terms stored in the list of spam terms 435. In some implementations, a score for a new account can be generated by adding respective scores for all terms in the document associated with the new account. In other implementations, the score for the new account can be generated by adding the respective scores for distinct terms in the document associated with the new account.

If a given term from the documents 405, 407 associated with the proposed accounts "AAA", and "BBB" is a term (i.e., the given term is present in the merged document 115,) the account scorer 455 can apply a score to the given term that is the corresponding spam likelihood of the given term as recorded in the list of spam terms 135. Else, if the given term from the documents 405, 407 is not a term, then the given term is deemed by the account scorer 455 unlikely to be spam and a score of "0" is applied to the given term.

The spam likelihood of a term from the list of spam terms can be stored as a real-number corresponding to the BTF-IDF score of the term. In these cases, the score applied by the account scorer 455 to a term identified in the documents 405, 407 is the corresponding BTF-IDF score of the term recorded in the list of spam terms 135.

In other implementations, the spam likelihood of a term from the list of spam terms 135 can be stored as a bit "1" when the term has a BTF-IDF score larger than a predetermined BTF-IDF score. In this case, the score applied by the account scorer 455 to each of the terms identified in the documents 405, 407 is "1".

In a first example implementation, the account scorer 455 generates an account score as the sum of scores of all the terms included in a document associated with an account. In this first example, the account scorer 455 applies scores to the terms included in the document associated with the account based on the BTF-IDF score of terms in the list of spam terms 135. Moreover, the instance of the account scorer 455' generates a score for the proposed account "AAA," and the instance of the account scorer 455" generates a score for the proposed account "BBB."

The terms from the document 405 (i.e., the terms that are also present in the merged document 115) are "plumbers", "inc", "main", "not", "a" and "storefront". The respective scores applied by the instance of the account scorer 455' to the terms from the document 405, based on the information in the table 125, are score("plumbers")=BTF-IDF("plumbers")=0.249, . . . , score("storefront")=BTF-IDF("storefront")=0.602.

Further, the instance of the account scorer 455' applies a score of "0" to the term "423" included in document 405, because this term is not blacklisted. The score X generated by the instance of the account scorer 455' for the proposed account "AAA" is generated as the sum of scores of all the terms in the document 405 associated with the proposed account "AAA."

$$X=\text{score}(\text{``plumbers''})+ \ldots +\text{score}(\text{``storefront''})+\text{score}(\text{``423''})=0.249+\ldots+0.602+\ldots+0=0.851+\ldots \quad (3)$$

The instance of the account scorer 455' can classify the proposed account "AAA" by comparing the score X generated for the proposed account "AAA," based on Equation (3), with a threshold score. In this first example implementation, a proposed account having an account score greater than a threshold score of 0.800 is classified as a spam account.

Consequently, the instance of the account scorer 455' classifies the proposed account "AAA" as a spam account because the generated score X=(0851+ . . . )>0.800. In other implementations, a threshold score of 0.500, 0.750, 0.900, 0.950, 0.990, etc., is used. Further, the instance of the account scorer 455' can update an instance of the account classification table 445' with the generated score X and the classification for the proposed account AAA. In addition, the instance of the account scorer 455' can instruct the I/O interface 450 to present the notification 458' to inform the user associated with the proposed account "AAA" that the account registration was denied.

The terms from the document 407, i.e., the terms that are also present in the merged document 405, are two instances of the term "service". The score applied by the instance of the account scorer 455" to the term from the document 407, based on the information in the table 125, is score("service")=BTF-IDF("service")=0.301. A score of "0" is applied by the instance of the account scorer 455" to each of the other terms included in the document 407 because these other terms, "Soren's", "plumbing", "800", "Maple", "prompt", "or", "the", "is" and "free", are not included in the merged document.

The score Y generated by the instance of the account scorer 455" for the proposed account "BBB" is generated as the sum of scores of all the terms in the document 407 associated with the proposed account "BBB"

$$Y=2\times\text{score}(\text{``service''})+\text{score}(\text{``Soren's''})+ \ldots +\text{score}(\text{``free''})=2\times 0.301+0+\ldots+0=0.602 \quad (4).$$

The instance of the account scorer 455" can classify the proposed account "BBB" by comparing the score Y generated for the proposed account BBB, based on Equation (4), with the threshold score which, for this first example implementation, equals 0.800. In this case, the instance of the account scorer 455" classifies the proposed account "BBB" as a non-spam account because the score Y=0.602<0.800. Further, the instance of the account scorer 455" can update an instance of the account classification table 445" with the generated score Y and the classification for the proposed account BBB. In addition, the instance of the account scorer 455" can instruct the I/O interface 450 to present the notification 458" to inform the user associated with the proposed account "BBB" that the account registration was accepted.

In a second example implementation, the account scorer 455 generates an account score as the sum of scores of distinct terms included in a document associated with an account. Further in this second example implementation, the account scorer 455 applies scores to the terms included in a document associated with an account based on the same rules for term scoring as in the first example implementation.

The scores applied to the terms included in the documents 405, 407 are the same as the term scores applied in the first example implementation. all the terms included in the document 405 associated with account "AAA" are distinct, the score generated in this second example implementation by the instance of the account scorer 455' for the proposed account "AAA" is the same score X=(0.851+ ... ) generated in the first example implementation in accordance with Equation (3). However, the term "service" occurs twice in the document 407 associated with proposed account B.

Therefore, the score Y generated by the instance of the account scorer 455" for the proposed account "BBB" is generated as the sum of scores of the distinct terms in the document 407 associated with the proposed account BBB.

$$Y = \text{score}(\text{"service"}) + \text{score}(\text{"Soren's"}) + \ldots + \text{score}(\text{"free"}) = 0.301 + 0 + \ldots + 0 = 0.301 \quad (5).$$

Moreover, the threshold score for classifying an account as spam account or non-spam account also is 0.800 as in the first example implementation. Once again, the proposed account "AAA" is classified as a spam account because the score X, generated based on Equation (3), is larger than 0.800, and the proposed account "BBB" is classified as a non-spam account because the score Y=0.301, generated based on Equation (5), is less than 0.800.

In a third example implementation, the account scorer 455 generates an account score based on the same rules of account scoring as in the first example implementation. Further in this third example, the score applied by the account scorer 455 to each of terms included in the document associated with the account is "1". Thus, the instance of the account scorer 455' applies a score of "1" to each of the terms from the document 405, "plumbers", "inc", "main", "not", "a" and "storefront," i.e., to the terms in the document 405 that are also present in the merged document 115; in addition, the instance of the account scorer 455' applies a score of "0" to the term "423," which is included in document 405 but is not blacklisted.

The score X generated by the instance of the account scorer 455' for the proposed account "AAA" is generated as the sum of scores of all the terms in the document 405 associated with the proposed account "AAA".

$$X = \text{score}(\text{"plumbers"}) + \text{score}(\text{"inc"}) + \text{score}(\text{main}) + \text{score}(\text{"not"}) + \text{score}(\text{"a"}) + \text{score}(\text{"storefront"}) + \text{score}(\text{"423"}) = 1 + 1 + 1 + 1 + 1 + 1 + 0 = 6 \quad (6).$$

The instance of the account scorer 455' can classify the proposed account "AAA" by comparing the score X generated for the proposed account AAA, based on Equation (6), with a threshold score. In this third example implementation, a proposed account having an account score greater than a threshold score of "5" is classified as a spam account. In other implementations, a threshold score of 5, 50, 500, etc., can be used. Consequently, the instance of the account scorer 455' classifies the proposed account "AAA" as a spam account because the generated score X=6>5.

The score applied by the instance of the account scorer 455" to the term "service" from the document 407 is "1". A score of "0" is applied by the instance of the account scorer 455" to each of the other terms included in the document 407, "Soren's", "plumbing", "800", "Maple", "prompt", "or", "the", "is" and "free", because these other terms are not blacklisted. The score Y generated by the instance of the account scorer 455" for the proposed account "BBB" is generated as the sum of scores of all the terms in the document 407 associated with the proposed account "BBB".

$$Y = 2 \times \text{score}(\text{"service"}) + \text{score}(\text{"Soren's"}) + \ldots + \text{score}(\text{"free"}) = 2 \times 1 + 0 + \ldots + 0 = 2 \quad (7).$$

The instance of the account scorer 455" can classify the proposed account "BBB" by comparing the score Y generated for the proposed account BBB, based on Equation (7), with the threshold score, which for this third example implementation, equals 5. In this case, the instance of the account scorer 455" classifies the proposed account "BBB" as a non-spam account because the score Y=2<5.

In a fourth example implementation, the account scorer 455 generates an account score based on the same rules of account scoring as in the second example implementation. Further, the account scorer 455 applies scores to the terms included in a document associated with an account based on the same rules for term scoring as in the third example implementation.

Therefore in this implementation, the scores applied to the terms included in the documents 405, 407 are the same as the term scores applied in the third example implementation. As all the terms included in the document 405 associated with the proposed account "AAA" are distinct, the score generated in this fourth example implementation by the instance of the account scorer 455' for the proposed account "AAA" is the same score X=6 generated in the third example implementation in accordance with Equation (6).

However, the term "service" occurs twice in the document 407 associated with the proposed account "BBB." Therefore, the score Y generated by the instance of the account scorer 455" for the proposed account "BBB" is generated as the sum of scores of the distinct terms in the document 407 associated with the proposed account "BBB".

$$Y = \text{score}(\text{"service"}) + \text{score}(\text{"Soren's"}) + \ldots + \text{score}(\text{"free"}) = 1 + 0 + \ldots + 0 = 1 \quad (8).$$

Moreover, in this fourth example implementation, the threshold score for classifying an account as spam account or non-spam account also is "5" as in the third example implementation. Once again, the proposed account "AAA" is classified as a spam account because the score X, generated based on Equation (6), is larger than 5, and the proposed account "BBB" is classified as a non-spam account because the score Y=1, generated based on Equation (8), is less than 5.

The systems and techniques described in this specification can be used in applications other than detecting spam, e.g., detecting other classifications or target content, such as offensive content, unwanted content, and the like.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
   receiving, for each of multiple accounts, a document associated with the account;
   identifying the accounts that have been designated as spam accounts;
   merging the documents that are associated with the accounts that have been designated as spam accounts, into a single, merged document;
   determining, for each of one or more terms that occur in the merged document, a blacklist term frequency (BTF) that represents a number of times that the term occurs in the merged document;
   determining a number of accounts that have not been designated as spam accounts;
   determining, for each of the terms, a number of the documents that are associated with accounts that have not been designated as spam accounts, in which the term occurs;
   determining, for each of the terms, an inverse document frequency (IDF) for the term based on the number of accounts that have not been designated as spam accounts, and the number of documents that are associated with the accounts that have not been designated as spam accounts, in which the term occurs;
   determining, for each of the one or more terms, a blacklist term frequency-inverse document frequency (BTF-IDF) score by multiplying the blacklist term frequency for the term by the inverse document frequency for the term;
   selecting, as spam terms, one or more of the terms whose respective BT-IDF score satisfies a threshold; and
   automatically determining whether to designate a new account as a spam account based at least on identifying an occurrence of one or more of the spam terms in a document associated with the new account.

2. The method of claim 1, wherein determining the IDF for each of the terms is based only on the number of accounts that have not been designated as spam accounts and on the number of documents that are associated with the accounts that have not been designated as spam accounts, in which the term occurs.

3. The method of claim 1, wherein the determined BTF-IDF score associated with a term in the merged document satisfies $$BTF\text{-}IDF = BTF \times \log\left(\frac{N+1}{k+1}\right),$$

where N represents the determined number of the accounts that have not been designated as spam accounts, and k represents the determined number of the documents that are associated with the accounts that have not been designated as spam accounts, in which the term occurs.

4. The method of claim 1 comprising associating spam likelihood to each of the one or more terms in the merged document, the spam likelihood associated with a term being proportional to the determined BTF-IDF score associated with the term.

5. The method of claim 1 comprising:
   generating a data structure of spam terms based on sorting the terms included in the merged document based on the respective determined BTF-IDF scores; and
   providing the generated data structure for assessing whether a given account is a spam account or a non-spam account.

6. The method of claim 1, wherein an account from among the multiple accounts is associated with an entity that requested to present entity-related information at a geo-location represented on an online map, and wherein the entity-related information is stored in the document associated with the account and includes the geo-location, the entity's identifier, description of products or services offered by the entity, and one or more of the entity's contact info and the entity's website information.

7. A nonvolatile computer storage medium encoded with a computer program, the program comprising instructions that when executed by one or more computers cause the one or more computers to perform operations comprising:
   receiving, for each of multiple accounts, a document associated with the account;
   identifying the accounts that have been designated as spam accounts;
   merging the documents that are associated with the accounts that have been designated as spam accounts, into a single, merged document;
   determining, for each of one or more terms that occur in the merged document, a blacklist term frequency (BTF) that represents a number of times that the term occurs in the merged document;
   determining a number of accounts that have not been designated as spam accounts;
   determining, for each of the terms, a number of the documents that are associated with accounts that have not been designated as spam accounts, in which the term occurs;
   determining, for each of the terms, an inverse document frequency (IDF) for the term based on the number of accounts that have not been designated as spam accounts, and the number of documents that are associated with the accounts that have not been designated as spam accounts, in which the term occurs;
   determining, for each of the one or more terms, a blacklist term frequency-inverse document frequency (BTF-IDF) score by multiplying the blacklist term frequency for the term by the inverse document frequency for the term;

selecting, as spam terms, one or more of the terms whose respective BT-IDF score satisfies a threshold; and automatically determining whether to designate a new account as a spam account based at least on identifying an occurrence of one or more of the spam terms in a document associated with the new account.

8. The nonvolatile computer storage medium of claim 7, wherein determining the IDF for each of the terms is based only on the number of accounts that have not been designated as spam accounts and on the number of documents that are associated with the accounts that have not been designated as spam accounts, in which the term occurs.

9. The nonvolatile computer storage medium of claim 7, wherein the determined BTF-IDF score associated with a term in the merged document satisfies $$BTF\text{-}IDF = BTF \times \log\left(\frac{N+1}{k+1}\right),$$

where N represents the determined number of the accounts that have not been designated as spam accounts, and k represents the determined number of the documents that are associated with the accounts that have not been designated as spam accounts, in which the term occurs.

10. The nonvolatile computer storage medium of claim 7, wherein the operations further comprise associating spam likelihood to each of the one or more terms in the merged document, the spam likelihood associated with a term being proportional to the determined BTF-IDF score associated with the term.

11. The nonvolatile computer storage medium of claim 7, wherein the operations further comprise:
generating a data structure of spam terms based on sorting the terms included in the merged document based on the respective determined BTF-IDF scores; and
providing the generated data structure for assessing whether a given account is a spam account or a non-spam account.

12. The nonvolatile computer storage medium of claim 7, wherein an account from among the multiple accounts is associated with an entity that requested to present entity-related information at a geo-location represented on an online map, and wherein the entity-related information is stored in the document associated with the account and includes the geo-location, the entity's identifier, description of products or services offered by the entity, and one or more of the entity's contact info and the entity's website information.

13. A system comprising:
one or more computers and one or more storage devices storing instructions that are operable, when executed by the one or more computers, to cause the one or more computers to perform operations comprising:
receiving, for each of multiple accounts, a document associated with the account;
identifying the accounts that have been designated as spam accounts;
merging the documents that are associated with the accounts that have been designated as spam accounts, into a single, merged document;
determining, for each of one or more terms that occur in the merged document, a blacklist term frequency (BTF) that represents a number of times that the term occurs in the merged document;
determining a number of accounts that have not been designated as spam accounts;
determining, for each of the terms, a number of the documents that are associated with accounts that have not been designated as spam accounts, in which the term occurs;
determining, for each of the terms, an inverse document frequency (IDF) for the term based on the number of accounts that have not been designated as spam accounts, and the number of documents that are associated with the accounts that have not been designated as spam accounts, in which the term occurs;
determining, for each of the one or more terms, a blacklist term frequency-inverse document frequency (BTF-IDF) score by multiplying the blacklist term frequency for the term by the inverse document frequency for the term;
selecting, as spam terms, one or more of the terms whose respective BT-IDF score satisfies a threshold; and
automatically determining whether to designate a new account as a spam account based at least on identifying an occurrence of one or more of the spam terms in a document associated with the new account.

14. The system of claim 13, wherein determining the IDF for each of the terms is based only on the number of accounts that have not been designated as spam accounts and on the number of documents that are associated with the accounts that have not been designated as spam accounts, in which the term occurs.

15. The system of claim 13, wherein the determined BTF-IDF score associated with a term in the merged document satisfies $$BTF\text{-}IDF = BTF \times \log\left(\frac{N+1}{k+1}\right),$$

where N represents the determined number of the accounts that have not been designated as spam accounts, and k represents the determined number of the documents that are associated with the accounts that have not been designated as spam accounts, in which the term occurs.

16. The system of claim 13, wherein the operations further comprise associating spam likelihood to each of the one or more terms in the merged document, the spam likelihood associated with a term being proportional to the determined BTF-IDF score associated with the term.

17. The system of claim 13, wherein the operations further comprise:
generating a data structure of spam terms based on sorting the terms included in the merged document based on the respective determined BTF-IDF scores; and
providing the generated data structure for assessing whether a given account is a spam account or a non-spam account.

18. The system of claim 13, wherein an account from among the multiple accounts is associated with an entity that requested to present entity-related information at a geo-location represented on an online map, and wherein the entity-related information is stored in the document associated with the account and includes the geo-location, the entity's identifier, description of products or services offered by the entity, and one or more of the entity's contact info and the entity's website information.

* * * * *